(12) United States Patent
Menez et al.

(10) Patent No.: US 7,882,961 B2
(45) Date of Patent: Feb. 8, 2011

(54) REPLACEABLE FUEL FILTER ELEMENT AND FUEL FILTER ASSEMBLY

(75) Inventors: Loick Menez, Fouesnant (FR); Kelly R. Schmitz, Cottage Grove, WI (US); Gerard Malgorn, Quimper (FR); Ismail C. Bagci, Cookeville, TN (US); Kevin C. South, Cookeville, TN (US); Jeffrey B. Sharp, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 590 days.

(21) Appl. No.: 11/888,037

(22) Filed: Jul. 31, 2007

(65) Prior Publication Data

US 2007/0267338 A1 Nov. 22, 2007
US 2009/0242475 A2 Oct. 1, 2009

Related U.S. Application Data

(63) Continuation-in-part of application No. 11/264,473, filed on Nov. 1, 2005.

(51) Int. Cl.
*B01D 27/00* (2006.01)
*B01D 35/00* (2006.01)
*B01D 35/28* (2006.01)
*B01D 27/06* (2006.01)
*B01D 35/30* (2006.01)

(52) U.S. Cl. .................. 210/455; 210/435; 210/440; 210/443; 210/445; 210/450; 210/451; 210/493.2; 210/493.5

(58) Field of Classification Search .............. 210/435, 210/440, 443, 445, 450, 451, 455, 493.2, 210/493.5, DIG. 17
See application file for complete search history.

(56) References Cited

U.S. PATENT DOCUMENTS

| | | | |
|---|---|---|---|
| 2,855,105 A * | 10/1958 | Nugent | 210/457 |
| 3,370,712 A | 2/1968 | Smith et al. | |
| 3,578,176 A | 5/1971 | Cuyler | |
| 4,632,755 A | 12/1986 | Degraffenried | |
| 4,818,398 A | 4/1989 | Lott et al. | |
| 5,858,231 A | 1/1999 | Drori | |
| 6,248,236 B1 * | 6/2001 | Hodgkins | 210/232 |
| 6,345,721 B1 | 2/2002 | Durre et al. | |
| 6,635,175 B2 * | 10/2003 | Stankowski | 210/232 |

(Continued)

FOREIGN PATENT DOCUMENTS

DE 8805049 U1 6/1988

(Continued)

OTHER PUBLICATIONS

International Search Report of PCT/US2008/009170, dated Nov. 10, 2008.

(Continued)

*Primary Examiner*—Krishnan S Menon
*Assistant Examiner*—Benjamin Kurtz
(74) *Attorney, Agent, or Firm*—Hamre, Schumann, Mueller & Larson, P.C.; J. Bruce Schelkopf

(57) ABSTRACT

One embodiment is a unique replaceable filter element. Further embodiments, forms, objects, features, advantages, aspects, and benefits shall become apparent from the following description and drawings.

14 Claims, 17 Drawing Sheets

U.S. PATENT DOCUMENTS

| | | |
|---|---|---|
| 2003/0196947 A1 | 10/2003 | Gundrum et al. |
| 2006/0186036 A1* | 8/2006 | South et al. ................ 210/443 |
| 2006/0243652 A1 | 11/2006 | Tubby et al. |
| 2007/0095744 A1 | 5/2007 | Bagci et al. |

FOREIGN PATENT DOCUMENTS

| | | |
|---|---|---|
| DE | 3838540 A1 | 5/1990 |
| WO | WO 03/082434 A1 | 10/2003 |
| WO | WO 2006/093981 A2 | 9/2006 |
| WO | WO 2006/094065 A2 | 9/2006 |

OTHER PUBLICATIONS

Written Opinion of the International Searching Authority of PCT/US2008/009170, dated Nov. 10, 2008.

* cited by examiner

REPLACEABLE FUEL FILTER ELEMENT AND FUEL FILTER ASSEMBLY

CROSS REFERENCE

This is a continuation-in-part application which claims the benefit of co-pending U.S. application Ser. No. 11/264,473 filed Nov. 1, 2005 and that application is incorporated by reference.

BACKGROUND

Replaceable filter elements and assemblies including replaceable filter elements have proven to be useful components of filtration systems for applications in internal combustion engines such as diesel engines. Replaceable filter elements can be provided along with other components of filtration systems to provide assemblies operable to filter liquids such as oil and other lubricants, hydraulics, fuels, and others. Present approaches to replaceable filter elements and assemblies suffer from a variety of drawbacks, limitations, disadvantages and problems including those respecting sealing adequacy, part count, complexity, serviceability, cost, durability, thermal matching and others.

SUMMARY

One embodiment is a unique replaceable filter element. Another embodiment is a unique assembly including a replaceable filter element. Further embodiments, forms, objects, features, advantages, aspects, and benefits shall become apparent from the following description and drawings.

DETAILED DESCRIPTION

Figure 1:
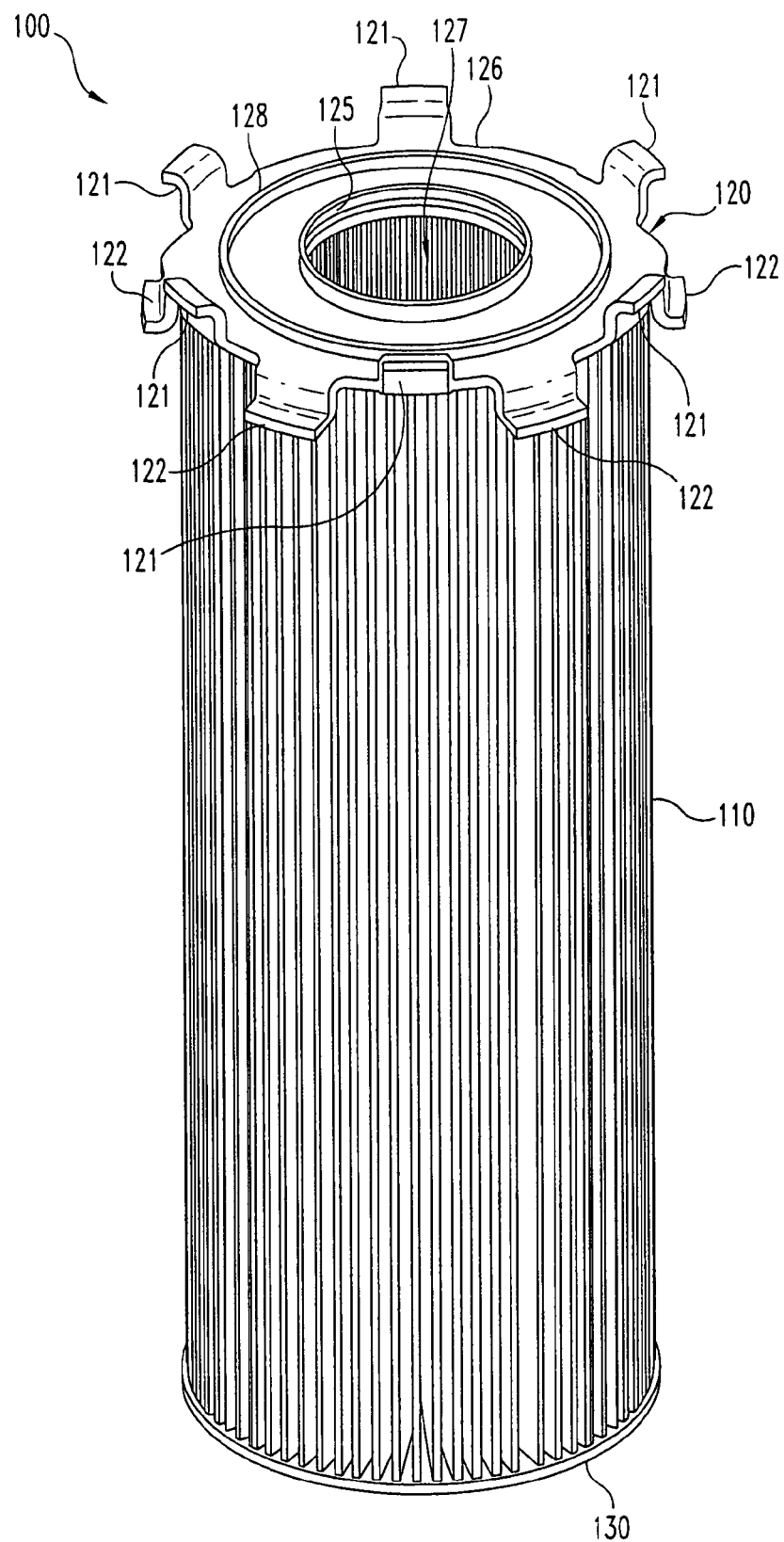
FIG. 1 is a perspective view of a replaceable filter element.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would occur to one skilled in the art to which the invention relates.

With reference to FIG. 1 there is illustrated a perspective view of a replaceable filter element 100. While replaceable filter element 100 is an engine lubricant filter in a preferred embodiment, it is also contemplated as being applicable to a filter for a variety of engine and vehicle fluids such as fuels, hydraulics, and others. Replaceable filter element 100 includes filter media 110, endplate 120 coupled to one end of filter media 110, and endplate 130 coupled to another end of filter media 110. In the illustrated embodiment, filter media 110 is an annular and pleated configuration extending from a first end to a second end and defining an interior cavity. Other embodiments contemplate other filter media configurations including, for example, a stack disc bypass filter media configuration or other filter media configurations.

Endplate 120 includes an opening 127 leading to the interior cavity of filter media 110. Sealing flange 125 is positioned adjacent opening 127 and extends from endplate 120 in a generally axial direction. Flange 128 is positioned radially outward from flange 125 and extends from endplate 120 in a generally axial direction. Endplate 120 extends from opening 127 to outer periphery 126. Endplate 120 also includes at least a first plurality of legs 121 which extend from periphery 126 and may also include a second plurality of legs 122 which extend from periphery 126 as is shown in the illustrated embodiment. Endplate 120 is preferably a unitary structure formed of a plastic material such as thermoplastic. Other embodiments contemplate that endplate 120 could be formed of multiple pieces coupled together.

Figure 2:
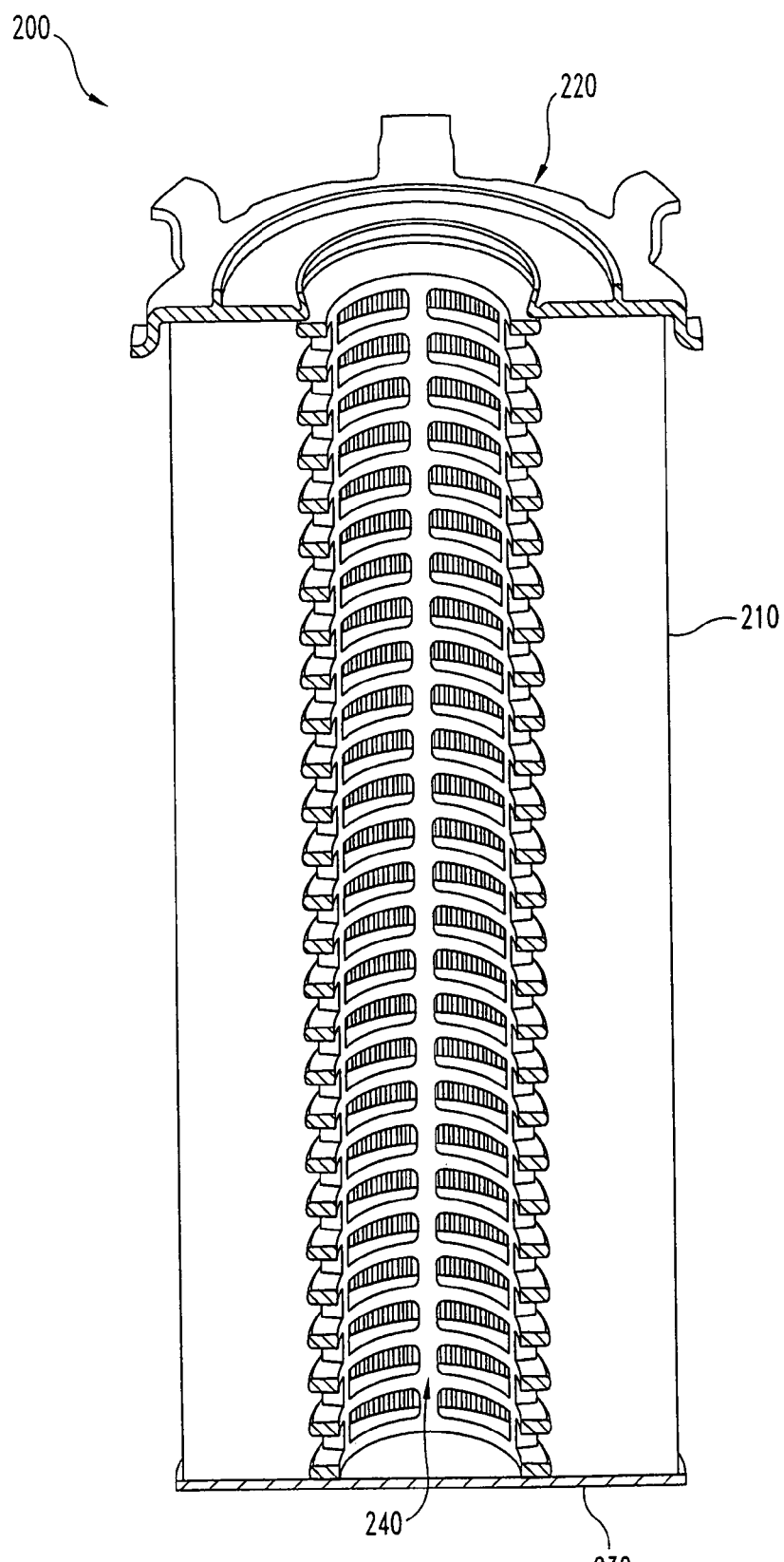
FIG. 2 is a sectional view of a replaceable filter element.

With reference to FIG. 2 there is illustrated a sectional view of a replaceable filter element 200. Replaceable filter element 200 includes filter media 210, endplate 220 coupled to one end of filter media 210, and endplate 230 coupled to another end of filter media 210 which are similar to filter media 110, endplate 120, and endplate 130 of replaceable filter element 100 described above in connection with FIG. 1. Replaceable filter element 200 also includes centerpost 240 which extends from endplate 230 to endplate 220 in the interior cavity of filter media 210. Other embodiments contemplate replaceable filter elements without a centerpost. In one replaceable filter element without a centerpost, endplate 230 includes an opening permitting a centerpost to be introduced into the interior cavity of filter media 210. The centerpost which is introduced into the interior cavity can be an independent component, or can be a component of another portion of a filter assembly.

Figure 3:
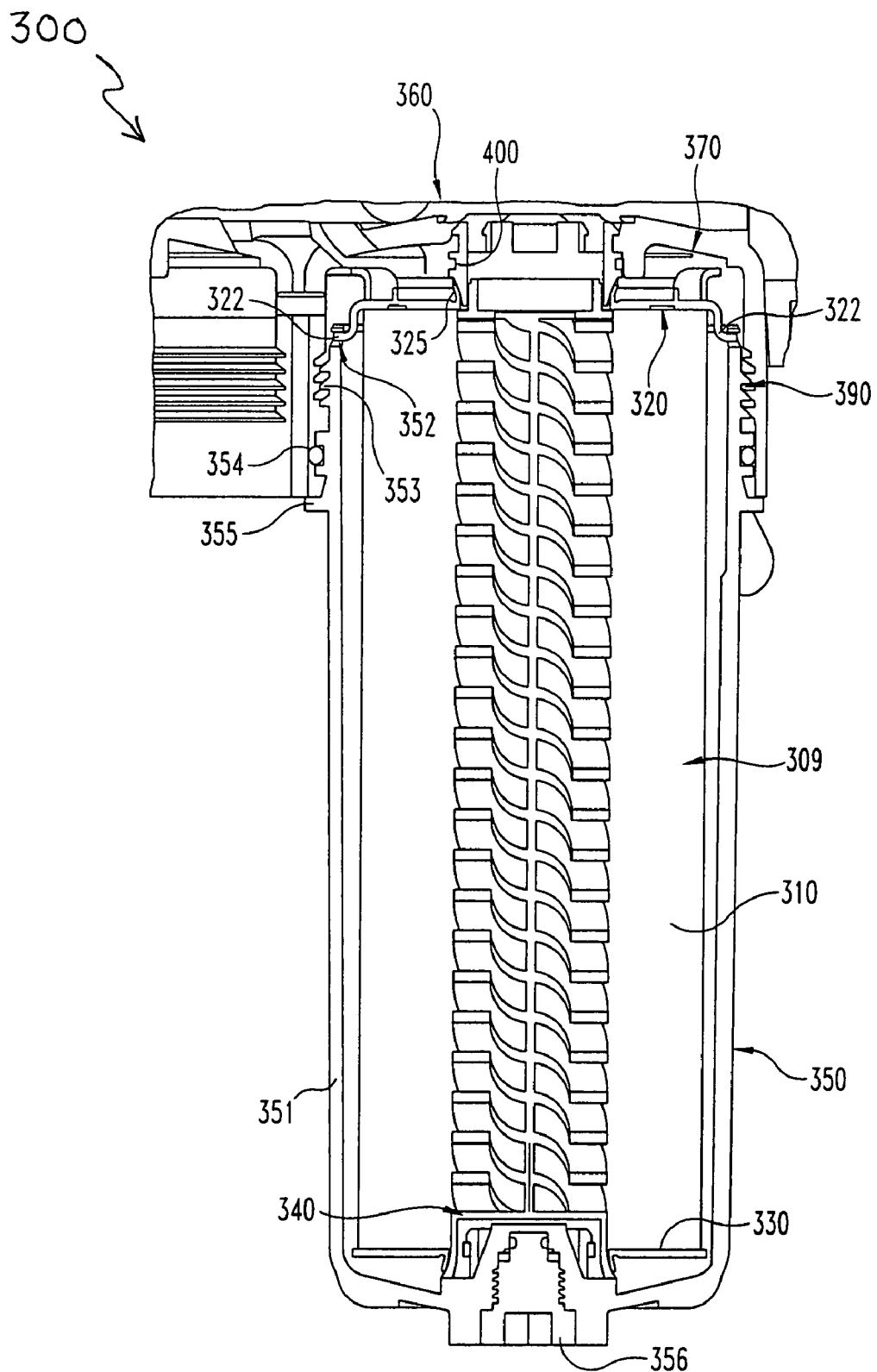
FIG. 3 is a sectional view of a filter assembly.

With reference to FIG. 3 there is illustrated a sectional view of a filter assembly 300. Filter assembly 300 includes a replaceable filter element 309, shell 350, filter head 360, and head insert 400. Replaceable filter element 309 includes filter media 310, endplate 320 coupled to one end of filter media 310, and endplate 330 coupled to another end of filter media 310 which are similar to filter media 110, endplate 120, and endplate 130 of replaceable filter element 100 described above in connection with FIG. 1.

Shell 350 includes a body wall 351 which defines a hollow interior into which replaceable filter element 309 is inserted. Shell 350 is received by receptacle 370 which is a region of filter head 360 configured to receive a portion of shell 350 and a portion of replaceable filter element 309. Shell 350 further includes recesses 352 which receive logs 322 of endplate 320, threads 353 which mate with threads 361 of receptacle 370 to form a threaded interconnection 390, sealing ring 354 which provides a seal between shell 350 and receptacle 370, and abutment flange 355 which contacts filter head 360. Shell 350 also includes centerpost 340 which is coupled to the bottom end of shell 350 and is introduced into the interior cavity of replaceable filter element 309 when replaceable filter element 309 is placed into the hollow interior of shell 350. Shell 350 further includes water drainage valve 356 located at the bottom of shell 350.

Head insert 400 is coupled with filter head 360 and extends into receptacle 370. Head insert 400 includes a bearing surface which contacts sealing flange 325 of endplate 320 to form a seal. Other embodiments contemplate that head insert 400 could be omitted and sealing flange 325 could contact a portion of filter head 360 to form a seal. In either instance sealing flange 325 can form a seal with the bearing surface that it contacts without requiring any intermediate structure such as a gasket or sealing ring. It is preferred that sealing flange 325 and the surface which it contacts are of the same or similar material, though the materials of the two components may differ in other embodiments.

Figure 4:
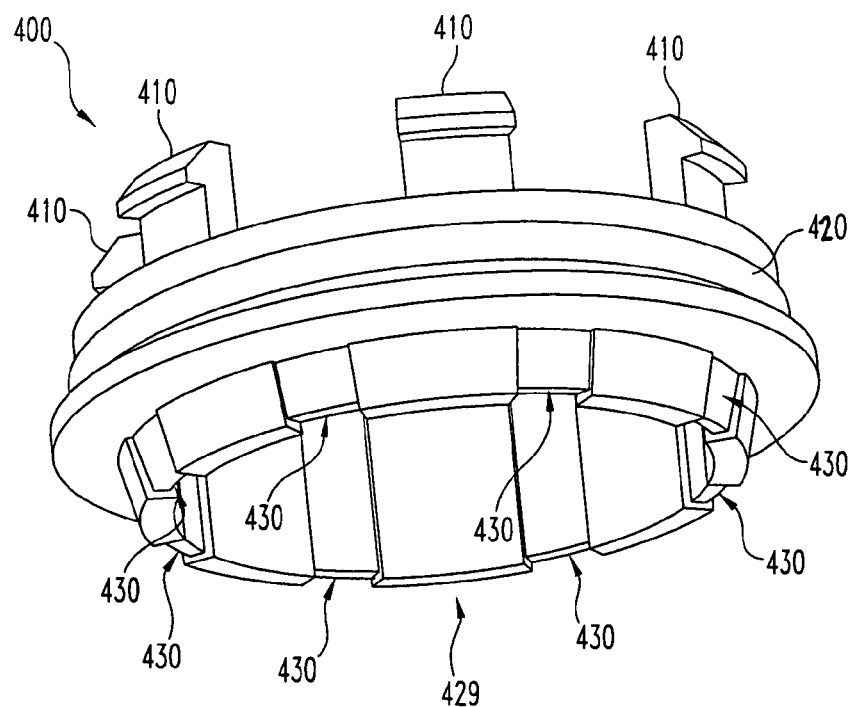
FIG. 4 is a perspective view of a head insert.

With reference to FIG. 4 there is illustrated a perspective view of a head insert 400. Head insert 400 includes detent clips 410 which can couple head insert 400 to a filter head, for example, as illustrated in FIG. 3. Other embodiments contemplate that head insert 400 and the other filter heads described herein could include other means for coupling to a filter head, such as, threads, other clips, screws, and other fasteners, for example. Head insert 400 also includes o-ring 420 which forms a seal between head insert 400 and the filter head. Head insert 400 further includes recesses 430 formed in lower rim 429 which can provide compatability detection for replaceable filter elements and rejection of incompatible filter elements. Embodiments which utilize recesses 430 contemplate that replaceable filter elements with sealing flanges or other structures configured to mate with recesses 430, for example by including protrusions which mate with recesses 430, will be used in a filter assembly. Head insert 400 will not couple with incompatible filter elements which lack compatible mating structures. Head insert 400 can provide protection against inadvertent installation of replaceable filter elements which are not suited for a particular application.

Figure 5:
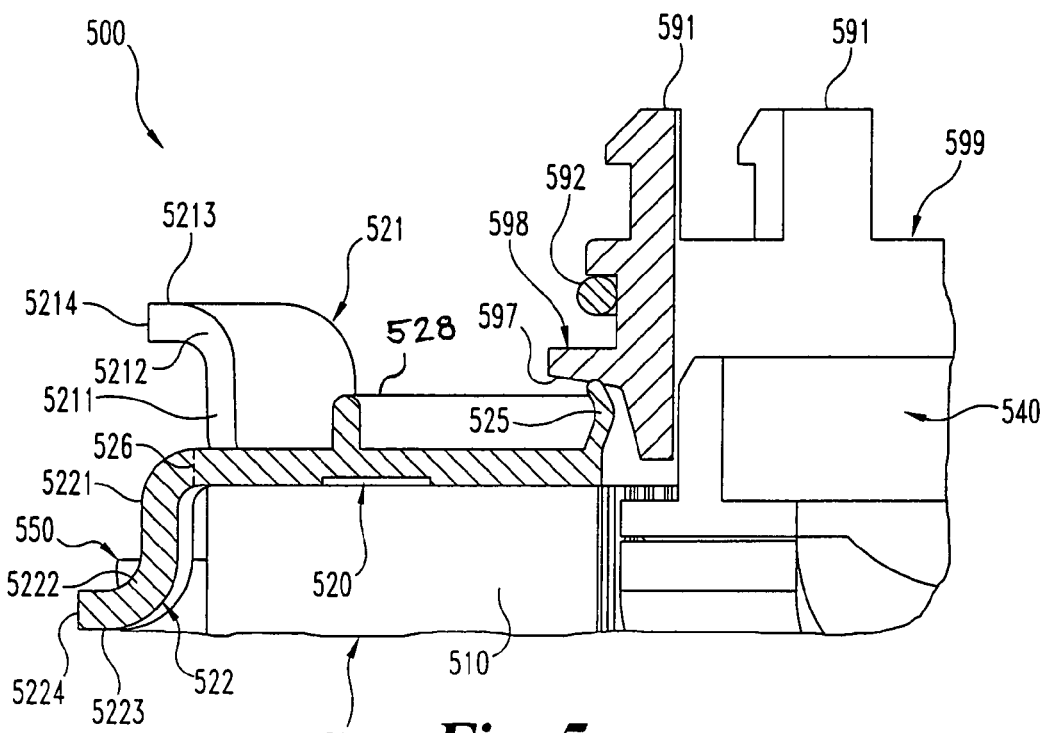
FIG. 5 is a sectional view of a portion of a filter assembly.

With reference to FIG. 5 there is illustrated a sectional view of a portion of a filter assembly 500. The illustrated portion of filter assembly 500 includes replaceable filter element 509, shell 550, head insert 599 which is coupled to a filter head (not illustrated), and centerpost 540 which has been positioned in the interior cavity of replaceable filter element 509. Replaceable filter element 509 includes filter media 510 and endplate 520 coupled to one end of filter media 510.

Endplate 520 is preferably a unitary structure formed of a plastic material such as thermoplastic. Other embodiments contemplate that endplate 520 could be formed of multiple pieces coupled together. Endplate 520 includes a sealing flange 525 which extends from endplate 520 in a generally axial direction. Flange 528 is positioned radially outward from flange 525 and extends from endplate 520 in a generally axial direction. Endplate 520 extends from a central opening to outer periphery 526. Endplate 520 also includes leg 521 which extends from periphery 526 and leg 522 which extend from periphery 526. Leg 521 includes a first portion 5211 which extends from periphery 526 in an axial direction away from filter media 510 to a bend 5212, and a second portion 5213 which extends from bend 5212 in a radially outward direction to leg extremity 5214. Leg 522 includes a first portion 5221 which extends from periphery 526 in an axial direction toward filter media 510 to a bend 522, and a second portion 5223 which extends from bend 5222 in a radially outward direction to leg extremity 5224. Endplate 520 further includes additional legs similar to legs 521 and 522 extending from other locations about periphery 526. A number of additional embodiments contemplate different shapes, sizes, numbers, and configurations for legs 521 and 522. For example, legs 521 and/or legs 522 could extend from periphery 526 at angles directed toward or outward relative to the angle of the illustrated embodiment. In another example, legs 521 and/or legs 522 extend from their respective bends in directions more upward or more downward relative to the direction of the illustrated embodiment. In a further example, the angle formed by the portions extending to and from the bends could be greater or lesser than that of the illustrated embodiment. In an additional example, one or more portions of legs 521 and/or legs 522 could have greater or lesser lengths, widths, thicknesses or other dimensions than those of the illustrated embodiment. In a further example, the curvature of one or more bends could be greater or lesser than the illustrated embodiment. In another example, legs 521 and/or 522 might omit bends and could extend directly to their respective extremities. In additional embodiments, the number and/or directional projection of legs may vary in further manners, for example, as illustrated elsewhere herein.

When replaceable filter element 509 is inserted into shell 550, leg 522 is received in a recess formed in shell 550. When shell 550 is coupled to a filter head contact between leg 522 and shell 550 provides a sealing force to endplate 520 including to sealing flange 525 in a direction axially toward head insert 599. Additionally, when shell 550 is coupled to a filter head contact between leg 521 and the filter head provides a force to endplate 520 in a direction axially toward shell 550. Head insert 599 includes detent clips 591 which couple head insert 599 to the filter head and o-ring 592 which forms a seal between head insert 599 and the filter head. Head insert 599 also includes flange 598 which includes surface 597. When replaceable filter element 509 is inserted into shell 550 and shell 550 is coupled to the filter head, surface 597 of flange 598 contacts sealing flange 525 to form a seal. The force between surface 597 of flange 598 and sealing flange 525 causes sealing flange 525 to deform, for example, to the illustrated position. Surface 597 is at a shallow angle which tends to cause sealing flange 525 to deform to the illustrated configuration. Other embodiments contemplate surfaces having different angles resulting in different sealing flange deformation, for example, inward, or outward to a greater or lesser degree. The force of sealing flange 525 against surface 597 is sufficient to maintain the seal between sealing flange 525 and surface 597, and intermediate structure such as a gasket or sealing ring is not necessary.

Figure 6:
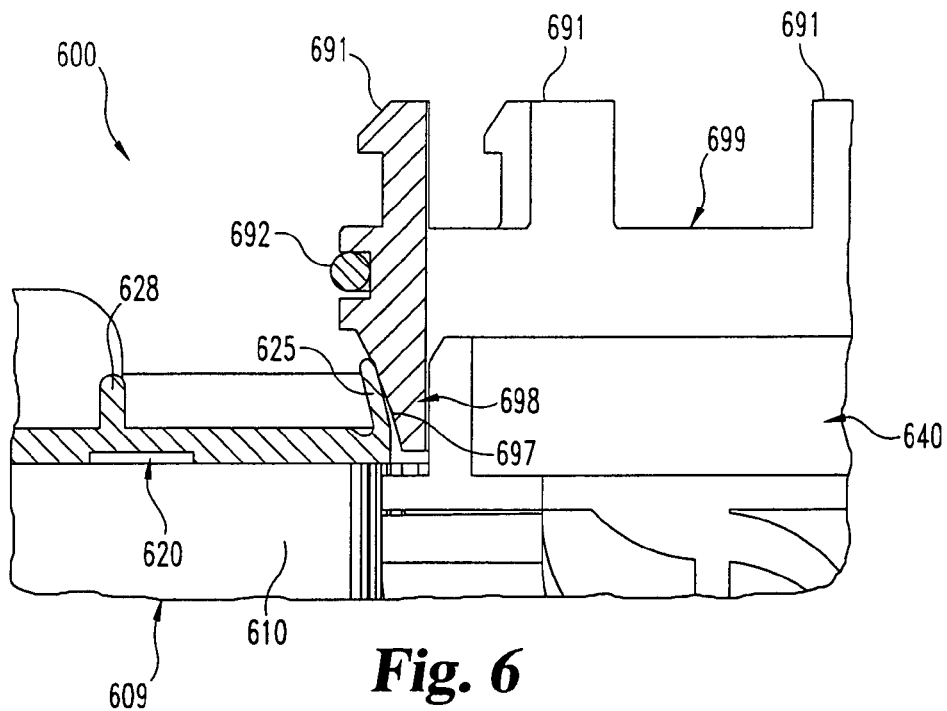
FIG. 6 is a sectional view of a portion of a filter assembly.

With reference to FIG. 6, there is illustrated a sectional view of a portion of a filter assembly 600. The illustrated portion of filter assembly 600 includes replaceable filter element 609 which is inserted into a shell (not illustrated) in the same or similar manner as described above, head insert 699 which is coupled to a filter head (not illustrated), and centerpost 640 which has been positioned in the interior cavity of replaceable filter element 609. The illustrated portion of replaceable filter element 609 includes filter media 610 and endplate 620 coupled to one end of filter media 610.

Endplate 620 is preferably a unitary structure formed of a plastic material such as thermoplastic. Other embodiments contemplate that endplate 620 could be formed of multiple pieces which could be coupled together. Endplate 620 includes a sealing flange 625 which extends from endplate 620 in a generally axial direction. Flange 628 is positioned radially outward from flange 625 and extends from endplate 620 in a generally axial direction. Endplate 620 extends from a central opening to outer periphery. Endplate 620 also includes legs (not illustrated) which extends from its outer periphery in the same or a similar manner as legs 521 and 522 described above in connection with FIG. 5.

When replaceable filter element 609 is inserted into the shell, contact between legs of replaceable filter element 609 and the shell provides a sealing force to endplate 620 including to sealing flange 625 in a direction axially toward head insert 699 in the same or a similar manner as was described above in connection with FIG. 5. Additionally, when the shell is coupled to the filter head, contact between other legs and the filter head provides a force to endplate 620 in a direction axially toward the shell. Head insert 699 includes detent clips 691 which couple head insert 699 to the filter head and o-ring 692 which forms a seal between head insert 699 and the filter head. Head insert 699 also includes member 698 which includes surface 697. When replaceable filter element 609 is inserted into the shell and the shell is coupled to the filter head, surface 697 contacts sealing flange 625 to form a seal. The force between surface 697 and the sealing flange 625 causes sealing flange 625 to deform, for example, to the illustrated position. Surface 697 is at a steeper angle than surface 597 of FIG. 5 which tends to cause sealing flange 625 to deform to the illustrated configuration. The force of sealing flange 625 against surface 697 is sufficient to maintain the seal between sealing flange 625 and surface 697, and intermediate structure such as a gasket or sealing ring is not necessary.

Figure 7:
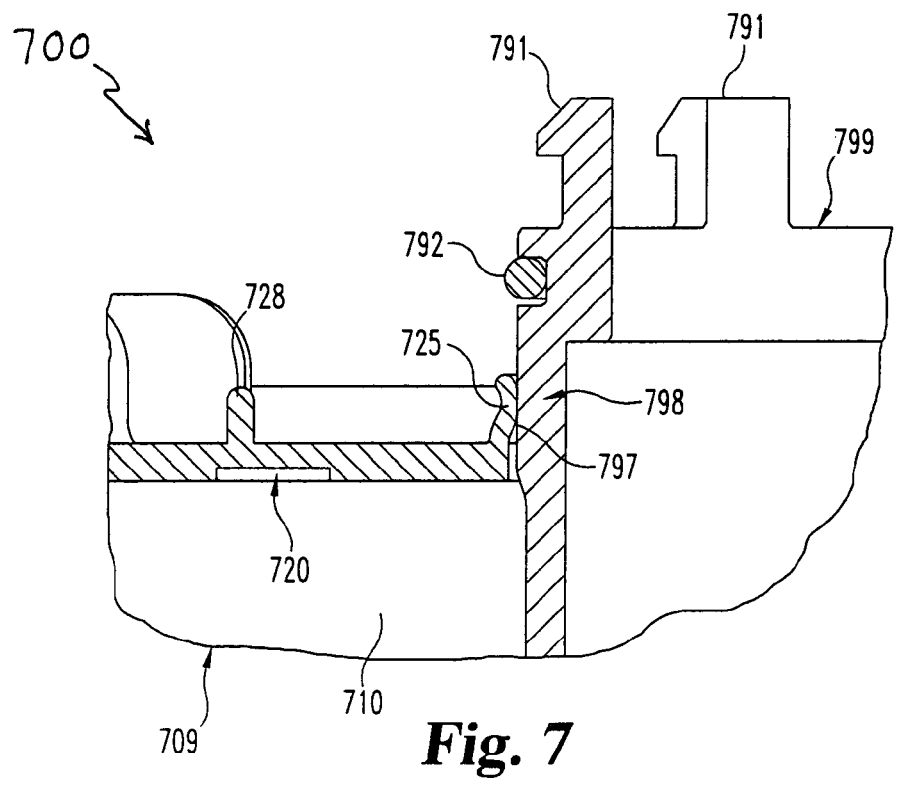
FIG. 7 is a sectional view of a portion of a filter assembly.

With reference to FIG. 7 there is illustrated a sectional view of a portion of a filter assembly 700. The illustrated portion of filter assembly 700 includes replaceable filter element 709 which is inserted into a shell (not illustrated) in the same or a similar manner as described above, head insert 799 which is coupled to a filter head (not illustrated), and centerpost 740 which has been positioned in the interior cavity of replaceable filter element 709. The illustrated portion of replaceable filter element 709 includes filter media 710 and endplate 720 coupled to one end of filter media 710.

Endplate 720 is preferably a unitary structure formed of a plastic material such as thermoplastic. Other embodiments contemplate that endplate 720 could be formed of multiple pieces coupled together. Endplate 720 includes a sealing flange 725 which extends from endplate 720 in a generally axial direction. Flange 728 is positioned radially outward from flange 725 and extends from endplate 720 in a generally axial direction. Endplate 720 extends from a central opening to outer periphery. Endplate 720 also includes legs (not illustrated) which extend from its outer periphery in the same or a similar manner as legs 521 and 522 described above in connection with FIG. 5.

When replaceable filter element 709 is inserted into the shell, contact between legs of replaceable filter element 709 and the shell provides a sealing force to endplate 720 including to sealing flange 725 in a direction axially toward head insert 799 in the same or a similar manner as was described above in connection with FIG. 5. Additionally, when the shell is coupled to the filter head, contact between other legs and the filter head provides a force to endplate 720 in a direction axially toward the shell. Head insert 799 includes detent clips 791 which couple head insert 799 to the filter head and o-ring 792 which forms a seal between head insert 799 and the filter head. Head insert 799 also includes member 798 which includes surface 797. When replaceable filter element 709 is inserted into the shell and the shell is coupled to the filter head, surface 797 contacts sealing flange 725 to form a seal. The force between surface 797 and the sealing flange 725 causes sealing flange 725 to deform, for example, to the illustrated position. Surface 797 is at a generally vertical angle relative to sealing flange 725 which tends to cause sealing flange 725 to deform to the illustrated configuration. The force of sealing flange 725 against surface 797 is sufficient to maintain the seal between sealing flange 725 and surface 797, and intermediate structure such as a gasket or sealing ring is not necessary.

Figure 8:
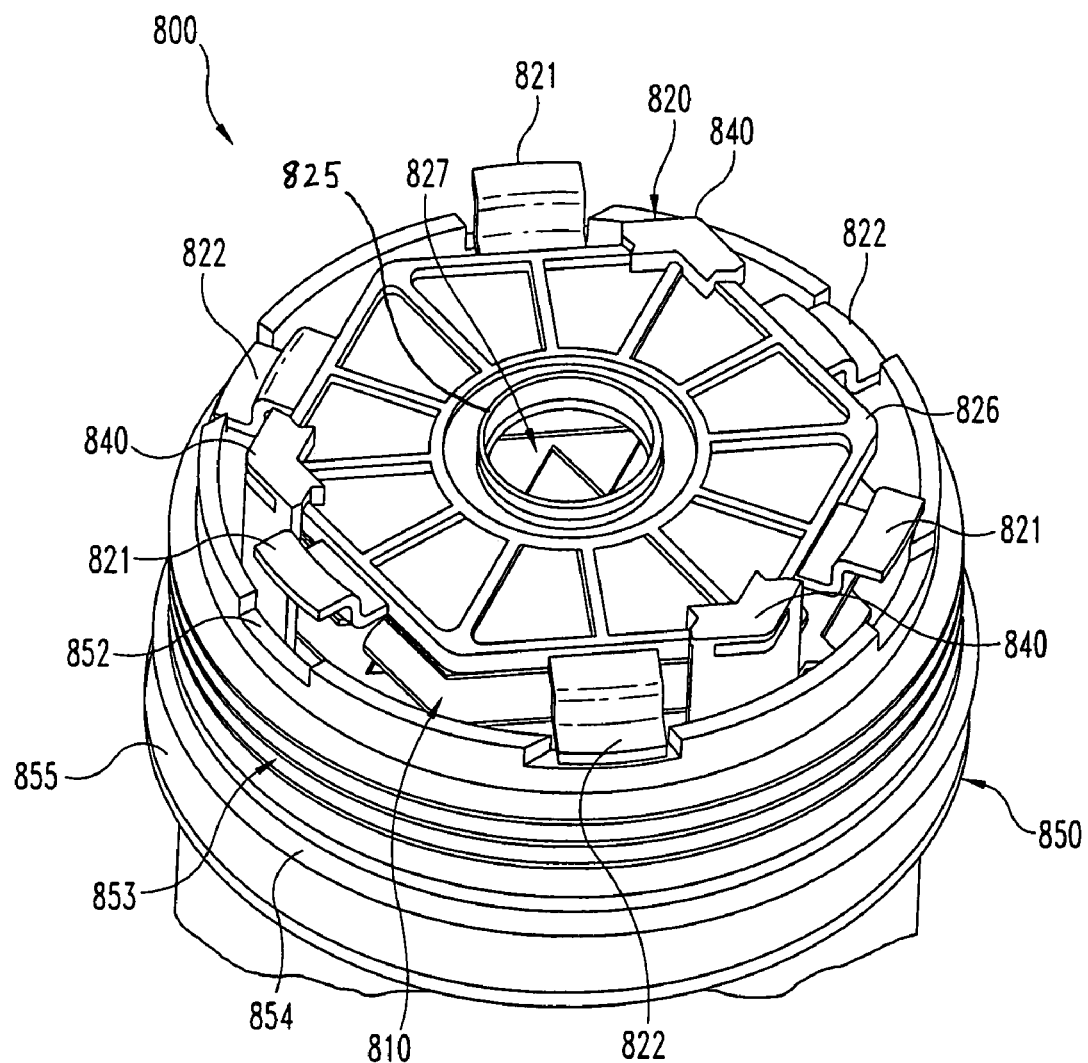
FIG. 8 is a perspective view of a portion of a filter assembly.

With reference to FIG. 8 there is illustrated a perspective view of a portion of a filter assembly 800. Filter assembly 800 includes a replaceable filter element 810 and a shell 850 which are configured to couple to a filter head which may include a head insert. Replaceable filter element 810 includes filter media, endplate 820 coupled to one end of the filter media, and may also include another endplate coupled to another end of filter media. Replaceable filter element 810 is a stack-disc bypass filter element which includes a plurality of stacked discs of filter media. Replaceable filter element 810 also includes vertically extending supports 840 which extend along the axial length of replaceable filter element 810.

Endplate 820 includes an opening 827 leading to the filter media of replaceable filter element 810. Sealing flange 825 is positioned adjacent opening 827 and extends from endplate 820 in a generally axial direction. Endplate 820 extends from opening 827 to outer periphery 826. Endplate 820 also includes at least a first plurality of legs 821 which extend from periphery 826 and may also include a second plurality of legs 822 which extend from periphery 826 as shown in the illustrated embodiment. Legs 821 and 822 extend from periphery 826 in the same or a similar manner as legs 521 and 522 described above in connection with FIG. 5. Endplate 820 is preferably a unitary structure formed of a plastic material such as thermoplastic. Other embodiments contemplate that endplate 820 could be formed of multiple pieces.

Shell 850 includes a body which defines a hollow interior into which replaceable filter element 810 is inserted. Shell 850 includes recesses 852 which receive legs 822 of endplate 820, threads 853 which mate, sealing ring 854, and abutment flange 855. Shell 850 may further include a water drainage valve (not illustrated) located at the bottom of shell 850.

Figure 9:
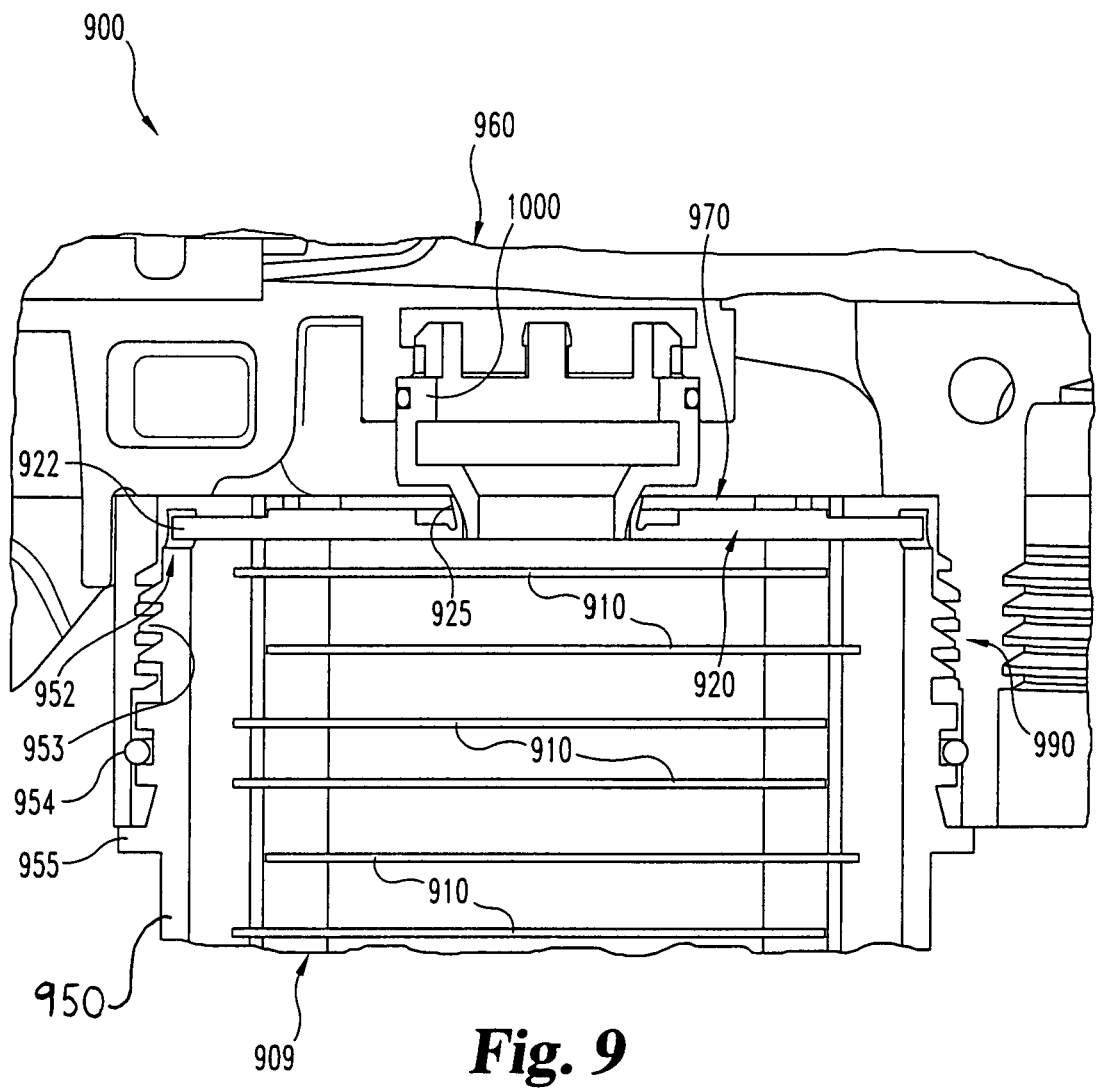
FIG. 9 is a sectional view of a portion of a filter assembly.
Figure 10:
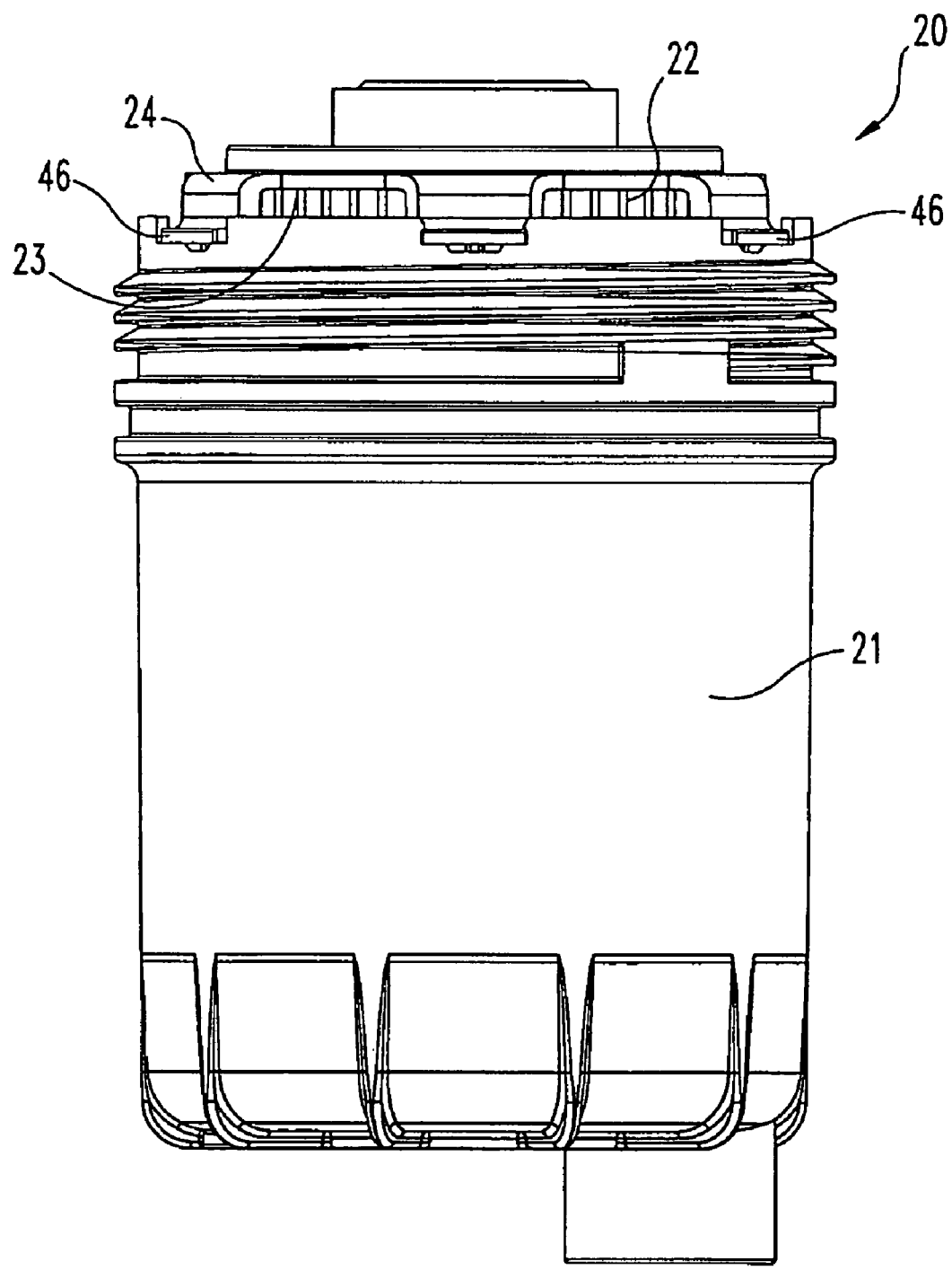
FIG. 10 is a front elevational view of a fluid filter assembly.

With reference to FIG. 9 there is illustrated a sectional view of a portion of a filter assembly 900. Filter assembly 900 includes a replaceable filter element 909, shell 950, filter head 990, and head insert 1000. Replaceable filter element 909 includes filter media 910, endplate 920 coupled to one end of filter media 910, and may include another endplate coupled to another end of filter media 910. Replaceable filter element 909 is a stack-disc bypass filter element which includes a plurality of stacked discs of filter media 910. Hollow interior portions are located between successive discs of filter media 910. Replaceable filter element 910 also includes vertically extending supports which extend along the axial length of replaceable filter element 909 in the same or a similar manner as vertically extending supports 840 described above in connection with FIG. 8.

Shell 950 includes a body wall 951 which defines a hollow interior into which replaceable filter element 909 is inserted. Shell 950 is received in receptacle 970 which is a region of filter head 960 configured to receive a portion of shell 950 and a portion of replaceable filter element 909. Shell 950 further includes recesses 952 which receive legs 922 of endplate 920, threads 953 which mate with threads of receptacle 970 to form a threaded interconnection 990, sealing ring 954 which provides a seal between shell 950 and receptacle 970, and abutment flange 955 which contact filter head 960. Shell 950 may further include a water drainage valve located at the bottom of shell 950.

Head insert 1000 is coupled with filter head 960 and partially extends into receptacle 970. Head insert 1000 includes a bearing surface which contacts sealing flange 925 of endplate 920 to form a seal. Other embodiments contemplate that head insert 1000 could be omitted and sealing flange 95 could contact a portion of filter head 960 to form a seal. In either instance sealing flange 925 can form a seal with the bearing surface that it contacts without requiring any intermediate structure such as a gasket or sealing ring. It is preferred that sealing flange 925 and the surface which it contacts are of the same or similar material though the materials of the two components may differ in other embodiments.

With reference to FIGS. 10-14, there is illustrated a fluid filter assembly 20 that is constructed and arranged for threaded connection to a fluid-delivery mounting head (not illustrated). Fluid filter assembly 20 includes a unitary, molded plastic shell 21 and a cooperating fluid filter cartridge 22. The fluid filter cartridge 22 (see FIG. 5) includes a generally cylindrical filtering media element or filter media pack 23 and a unitary, molded plastic endplate 24 that is securely attached, such as by adhesive bonding, to the upper end of the filter media pack 23. In further embodiments, the fluid filter cartridge could conform to the other embodiments described herein.

With reference to FIGS. 15-18, a shell 21 is illustrated. The generally cylindrical body 27 includes an annular sidewall 28 that defines open end 29. Shell 21 also includes a closed base 30 that is integral with cylindrical body 27. While the base 30 is described as "closed", there are two defined apertures 31 and 32 (see FIG. 12). These two defined apertures provide the capability of water sensing (31) and water drainage (32) for the fluid filter assembly 20. The additional socket 35 is for a one-way removal feature. The inner surface 33 of sidewall 28 includes a uniformly spaced-apart series of structural ribs 34. Ribs 34 are unitarily molded as part of shell 21 and provide structural support and rigidity to the shell as well as a deterrent against the attempted use of any non-standard filter media, such as a spin-on filter style intended for single-use as part of a disposable fluid filter assembly. One feature of note, though not illustrated, is the elimination from these inner ribs 34 of any type of rib ledge or shelf that would typically be used to support the filtering element (spin-on, single-use style) as depicted in certain prior constructions. Eliminating a rib ledge or shelf and extending ribs 34 axially provides the mentioned structural support to shell 21 and eliminates any support structure that might otherwise control the axial depth of an installed fluid filter cartridge. This structural design change to shell 21 in turn requires some utilization of the open end 29 in order to control the insertion depth of any fluid filter or filter media pack into shell 21.

The outer surface 37 of sidewall 28 adjacent upper edge 38 of open end 29 is constructed and arranged with a series of molded threads 39 that are used to securely attach fluid filter assembly 20, for example, to a fluid-routing head (not illustrated). Further, the sidewall 28, in cooperation with the closed base 30, defines a generally cylindrical interior space for shell 21 that is constructed and arranged to receive the fluid filter cartridge 22. Upper edge 38 that helps to define open end 29 is considered to be an exposed or free edge and open end 29 constitutes the entrance opening of the shell, noting that the opposite end of the shell includes closed base 30. As noted, the fluid filter cartridge 22 is installed into the shell by inserting the fluid filter cartridge into the interior space by way of this entrance opening.

Shell 21 is preferably a molded plastic shell that is used without a nutplate though additional embodiments contemplate use of a nutplate. The enlarged series of outer threads 39, in terms of the outside diameter size of shell 21, requires a compatible head design so as to change from the head structure that would be used for head connection to a nutplate. Shell 21 is constructed and arranged so as to reject or prevent the insertion of a spin-on style of fluid filter. Both single use and multi-use embodiments are contemplated. Wall thickness can be somewhat less for a single use filter assembly as compared to the desire for a slightly thicker wall when the shell is designed for multiple uses, i.e., reuse with replaceable fluid filter cartridges, as presented for the disclosed invention. If the same basic shell shape is going to be used for both types of fluid filter assemblies, disposable as well as multiple use, various design changes will be made.

Figure 15:
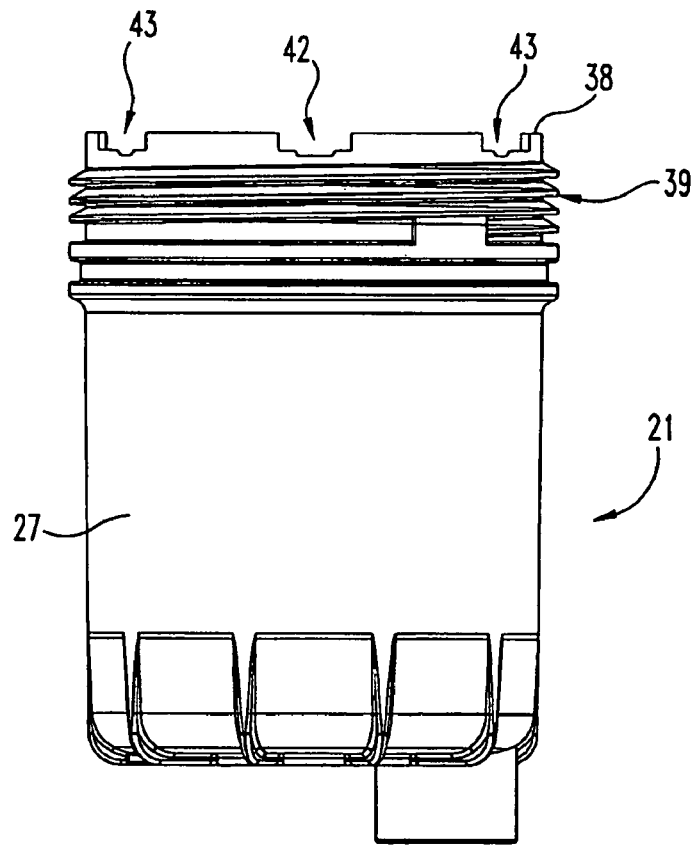
FIG. 15 is a front elevational view of a molded plastic housing comprising a portion of FIG. 10.
Figure 16A:
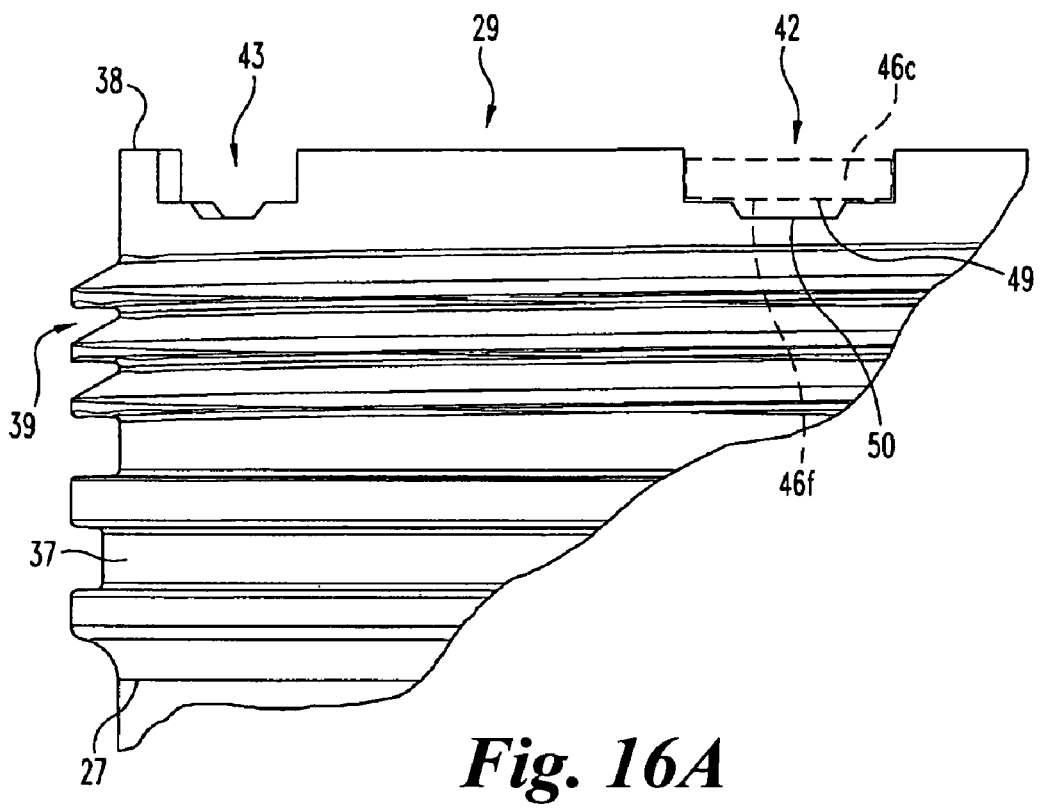
FIG. 16A is a partial, enlarged detail view of one slot style.
Figure 16B:
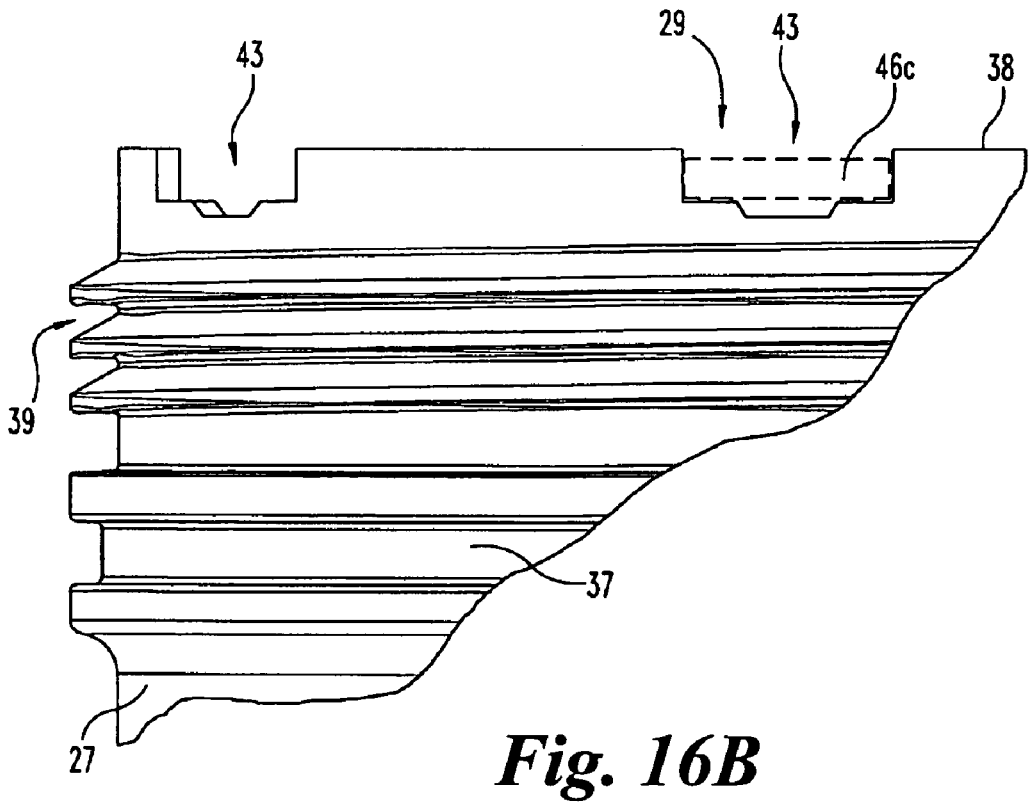
FIG. 16B is a partial, enlarged view of another slot style.
Figure 17:
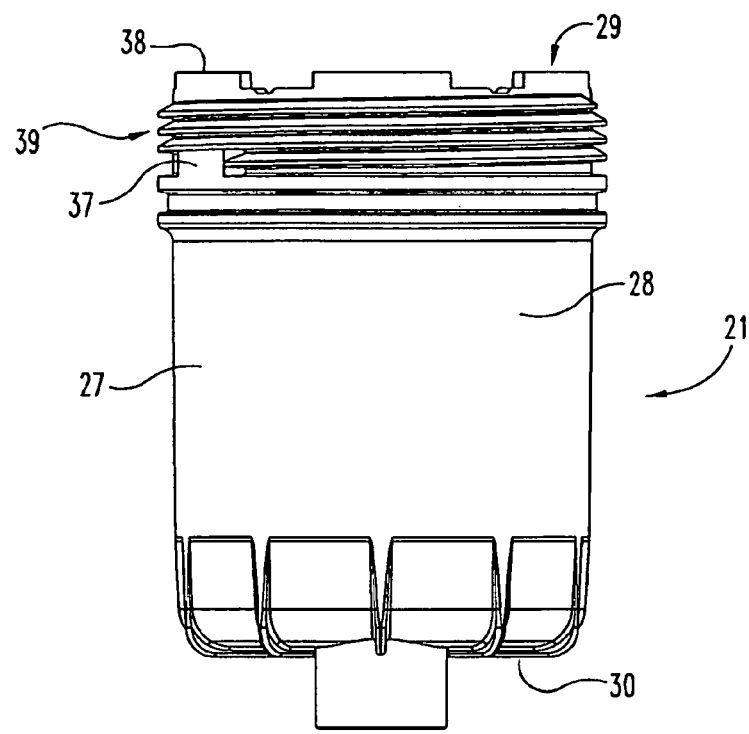
FIG. 17 is a side elevational view of FIG. 15.
Figure 18:
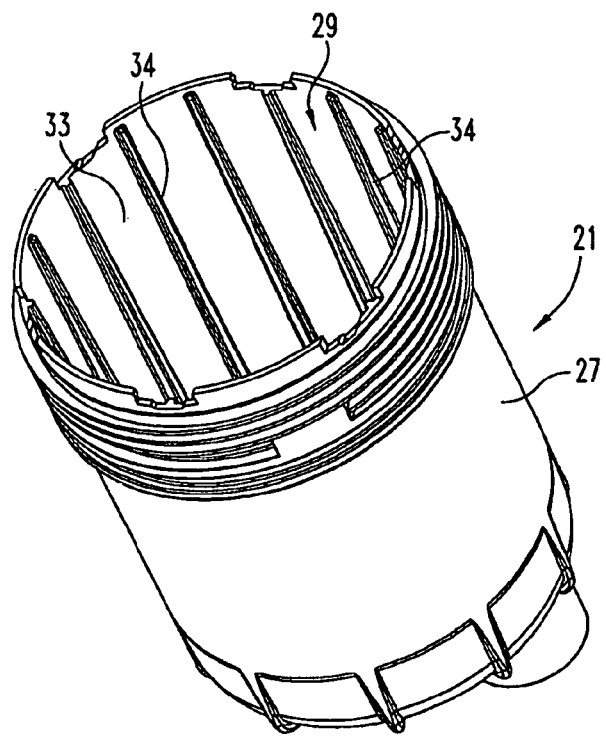
FIG. 18 is a perspective view of FIG. 15.

For some of the shell design differences, the spin-on, disposable style does not require any notches or slots, as shown in FIGS. 15, 16A and 16B, while the replaceable, cartridge style preferably includes such notches. For the spin-on, disposable style, radial ledges are preferably used as part of the structural ribs on the interior of the shell to position the fluid filter element and to set its axial height down into the interior of the shell. The replaceable cartridge style does not require radial ledges since its axial depth and positioning are controlled by the endplate configuration and its interfit into the spaced series of six notches or slots 42 and 43. When the rib ledges are molded as part of the unitary plastic shell, the interior space of the shell can be described as having an interior abutment ledge. This surface that supports or otherwise positions the lower portion of the installed fluid filter element to maintain the proper axial depth of that element into the shell.

If a spin-on, disposable style of fluid filter assembly is selected, the core diameter for the shell molding process can be increased in size, resulting in a thinner wall as compared to the increased wall thickness desired for the replaceable, fluid filter cartridge style. This difference in wall thickness assumes that the overall outer size and shape of the shell is basically the same for both of these fluid filter assembly styles. When the fluid filter assembly is designed as a single-use, disposable assembly, the shell wall thickness does not have to be as great as when the shell is used and re-used multiple times. Varying the shell wall thickness can be achieved by varying the inserted core diameter during the molding process.

In order for shell 21 to be configured for use with a replaceable cartridge style of fluid filter element, the upper exposed edge 38 can be configured with a series of six (6) recessed notches or slots (see FIGS. 15, 16A and 16B). In the preferred embodiment that is illustrated, there are two slots 42 that are constructed and arranged with a first shape and four slots 43 that are constructed and arranged with a second shape that is slightly different from the first shape. In one arrangement of the disclosed fluid filter assembly, these six slots 42 and 43 are equally spaced around upper edge 38. For this one arrangement of six (6) slots, the replaceable fluid filter cartridge 22 can be installed in any one of six orientations in terms of its rotation relative to the shell, as will be described herein as part of the description of the fluid filter cartridge 22 and endplate 24. In a second arrangement, the spacing between the series of six (6) slots 42 and 43 is not equal, but random or varied, such that there is only a single orientation for the fluid filter cartridge to insert into the shell 21. A varied spacing for the six slots requires a corresponding varied spacing for the projections 46 of the endplate 24, as described herein.

Figure 19:
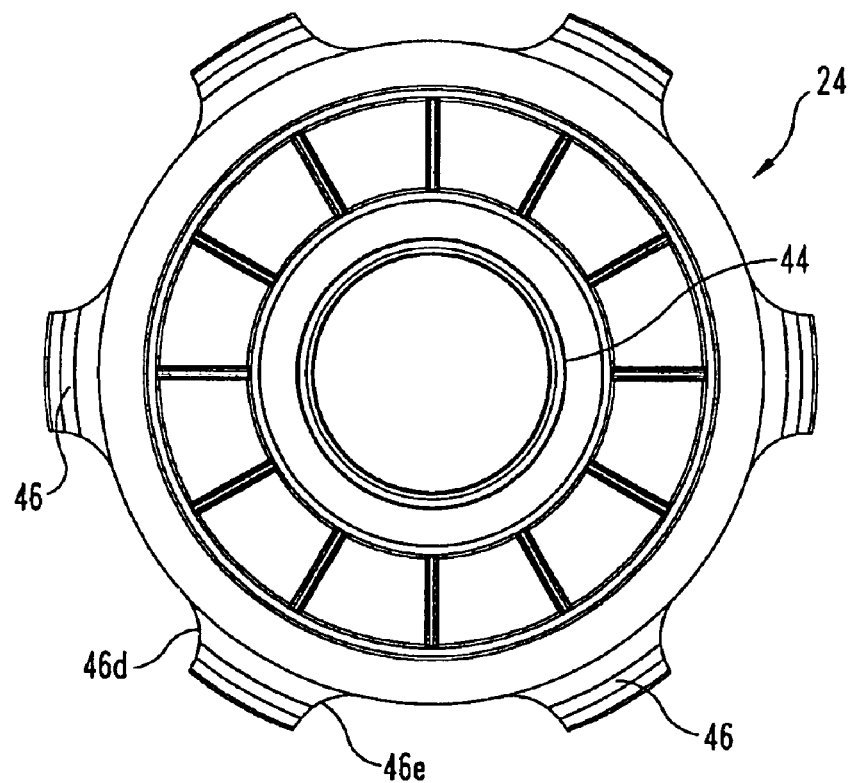
FIG. 19 is a top plan view of a molded plastic endplate comprising a portion of FIG. 14.
Figure 20:
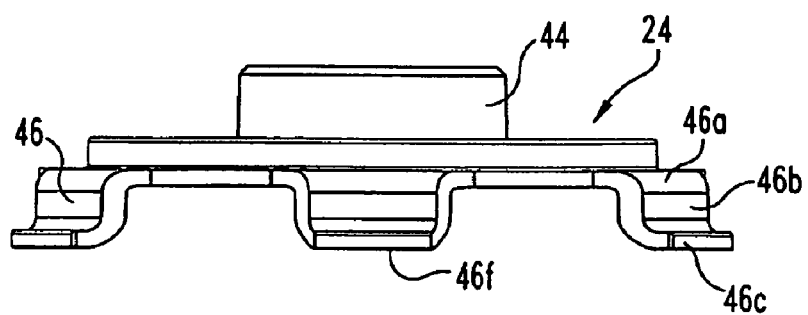
FIG. 20 is a front elevational view of FIG. 19.
Figure 21:
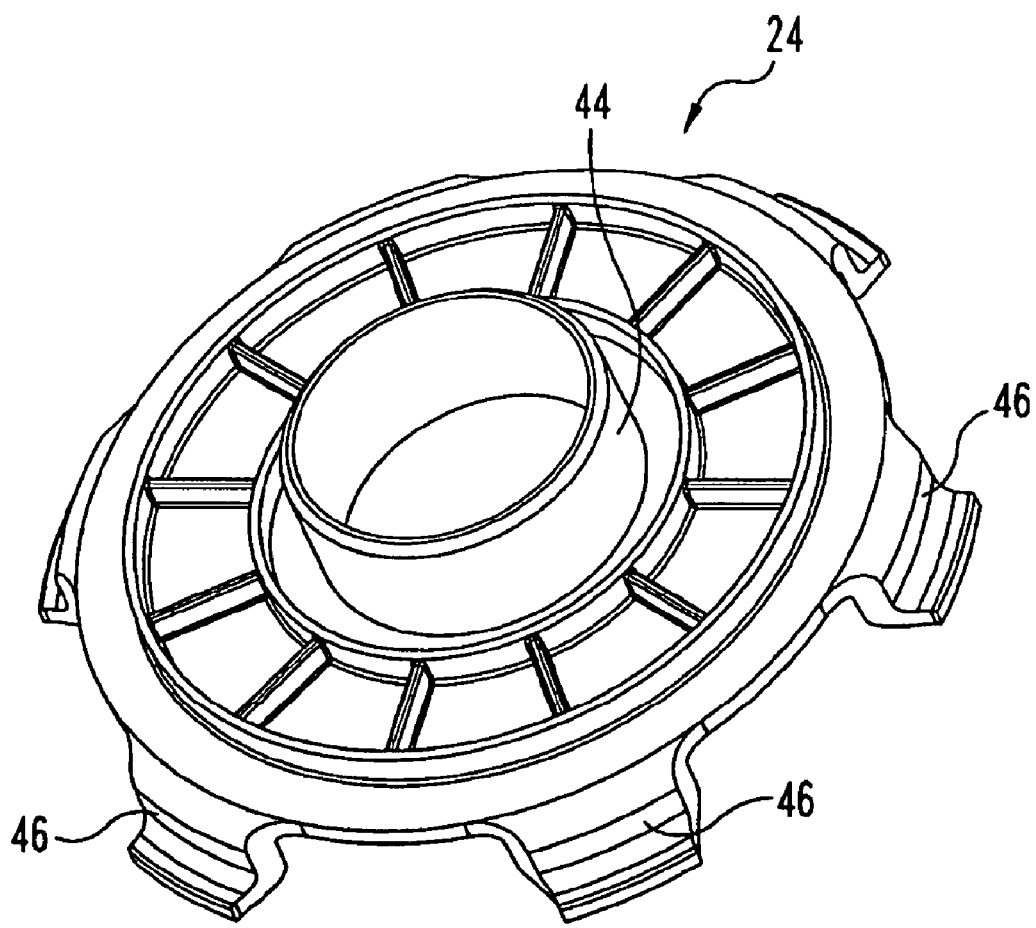
FIG. 21 is a perspective view of FIG. 19.

Referring to FIGS. 19-21, endplate 24 is illustrated. The filtering media pack 23 is a generally cylindrical, pleated, filtering media structure or element and the plastic endplate 24 is adhesively bonded to the upper exposed end of the filter media pack 23 in order to create fluid filter cartridge 22. Endplate 24 is a unitary, molded plastic component that includes an open cylindrical sleeve 44 for receipt by the head for routing of the exiting fluid after it passes through the filtering media pack 23. An annular face seal (sealing) gasket 45 is positioned around sleeve 44 (see FIGS. 11 and 12) for a liquid-tight sealed interface between the endplate 24 and the head. As the shell threads onto the head, the gasket 45 engages a surface of the head causing gasket compression with continued threaded engagement.

Seating of the fluid filter cartridge 22 into shell 21 is achieved by the use of slots 42 and 43 and cooperating outwardly-extending radial projections 46. There are six projections 46 that are constructed and arranged to match the spacing of the slots 42 and 43. Each projection 46 has an L-shaped form with an upper, outwardly extending section 46a, an axially depending section 46b, and a lower, outwardly extending radial lip 46c. While there are two styles of slots 42 and 43 as described and as will be explained in greater detail, all six projections 46 are constructed and arranged with the same size and shape. Each projection 46 includes concave side surfaces 46d and 46e (see FIG. 19), creating the appearance of an outwardly tapering shape for each projection 46. Radial lip 46c is constructed and arranged with a generally horizontal, substantially flat lower surface 46f.

As is illustrated and as would be understood from the foregoing descriptions, upper edge 38 of sidewall 28 defines open end 29. The inside diameter surface of upper edge 38 (or sidewall 28 at its upper end) coincides with the outside diameter of the open area of the generally circular open end 29. So that fluid filter cartridge 22 uses upper edge 38 for the positioning of cartridge 22 within shell 21, the outside diameter dimension of the endplate 24, as measured over or across the outer tips of the projections 46, preferably exceeds the outside diameter of the open area of open end 29. The outside diameter across the outer tips of projections 46 preferably does not extend beyond the outside diameter of shell 21, at least not to any noticeable degree or extent that would potentially interfere with the threaded connection of the shell 21 to the head.

Figure 11:
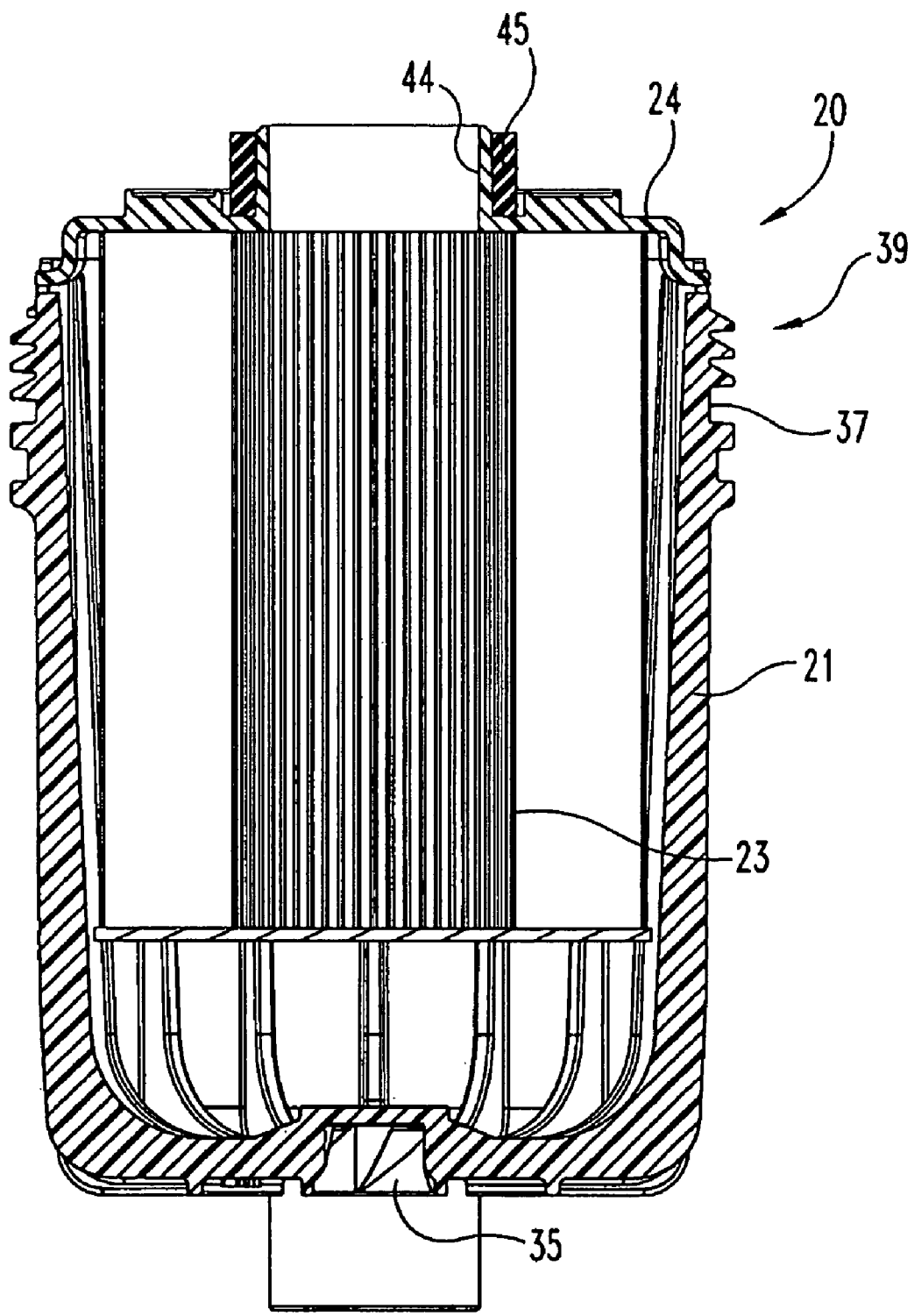
FIG. 11 is a side sectional view of the FIG. 10 fluid filter assembly.
Figure 12:
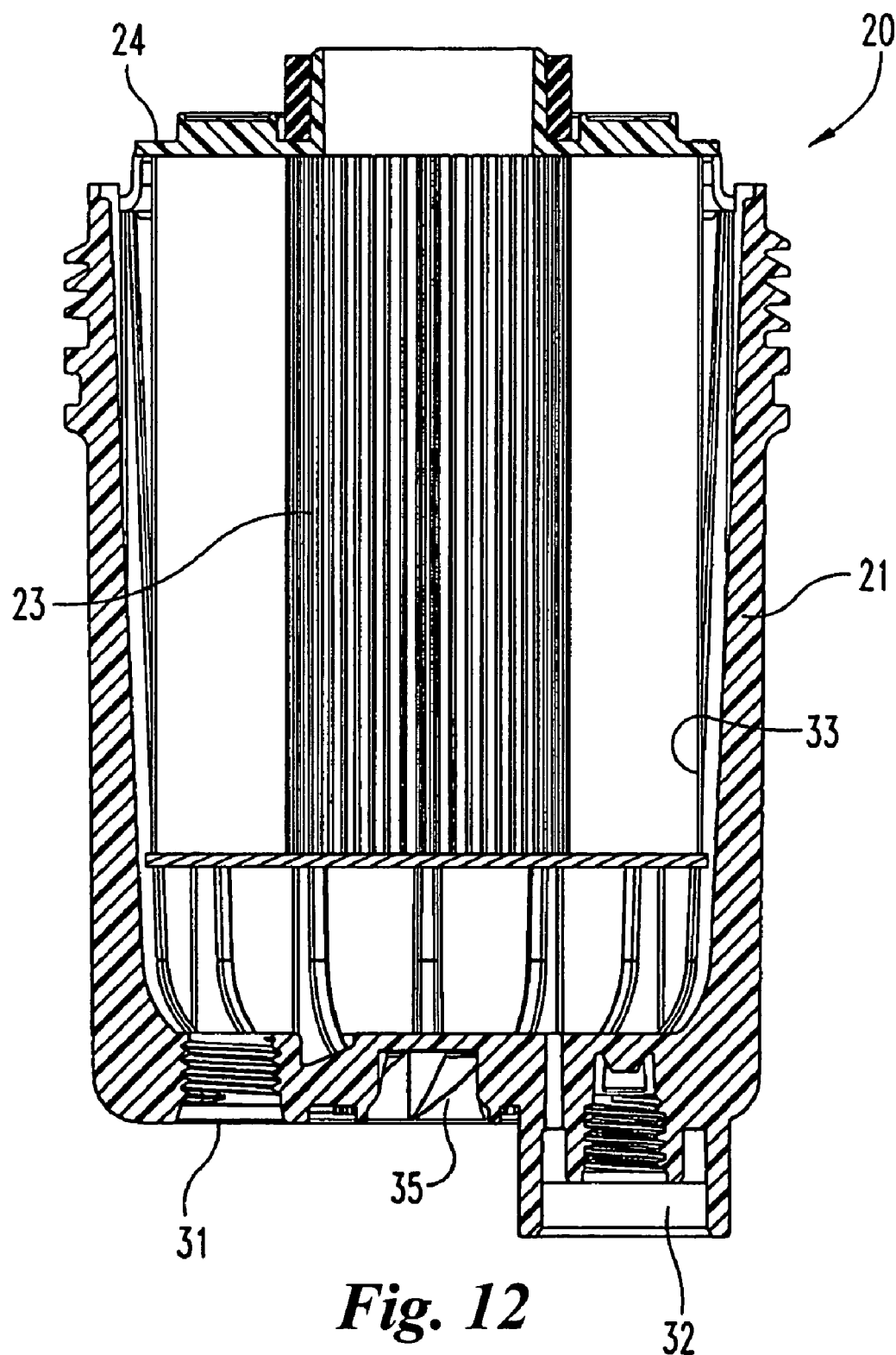
FIG. 12 is a front sectional view of the FIG. 10 fluid filter assembly.
Figure 13:
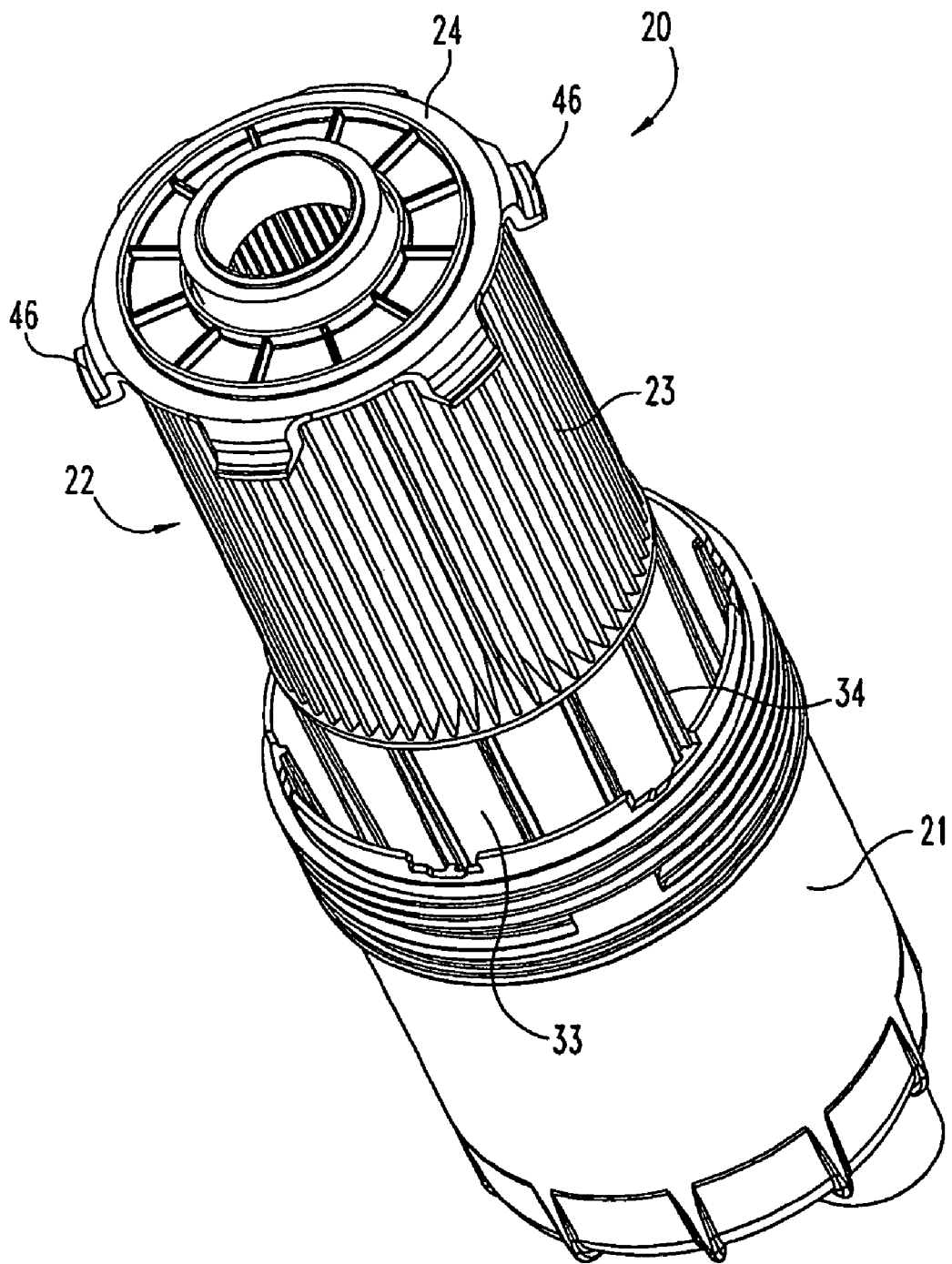
FIG. 13 is an exploded view of FIG. 10 fluid.
Figure 14:
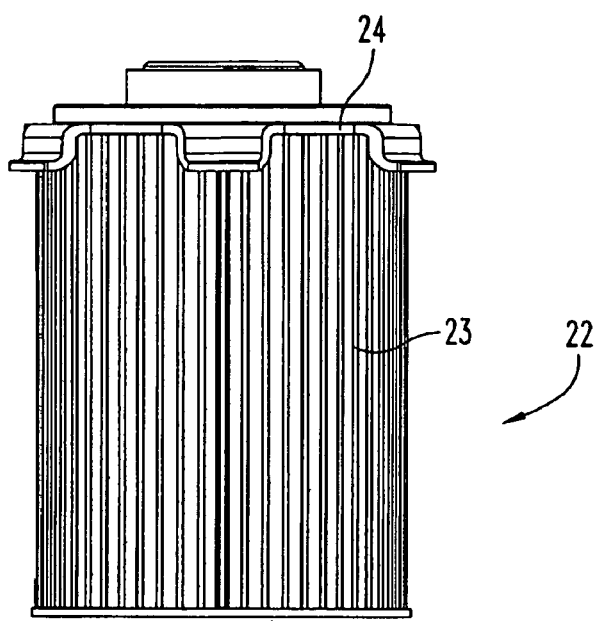
FIG. 14 is a front elevational view of a fluid filter cartridge comprising one portion of FIG. 10.

In terms of the number of slots and the number of projections, it will be noted that the proper assembly of the fluid filter cartridge 22 into shell 21 requires a receiving slot, either 42 or 43, for each projection 46. If there are any slots in upper edge 38 that do not receive a projection 46, then there is a gap left at that location on edge 38. If there is an "extra projection 46 that does not have a corresponding receiving slot, properly sized and positioned, it will cause interference with the upper edge 38 of shell 21 at the time of attempted installation of the cartridge 22 into the shell 21. This interference of a projection 46 resting on top of edge 38 prevents proper seating of the fluid filter assembly against the head. The assembly and proper seating of fluid filter cartridge 22 into shell 21 is illustrated in FIGS. 11 and 12. This proper seating positions each projection 46 down into a corresponding one of the receiving slots 42, 43. The two slots 42 are constructed and arranged for a secure capture of the inserted projection 46, for example, by an interference fit. The other four slots 43 are each constructed and arranged for a close clearance receiving fit of their corresponding projection 46. These other four slots 43 provide support for the fluid filter cartridge 22. All six slots 42, 43 cooperate with their receiving projections 46 in order to set the desired insertion depth of the fluid filter cartridge 22 into shell 21. The interfit between the projections 46 and slots 42, 43 also prevents any rotation of the fluid filter cartridge 22 relative to shell 21, once the fluid filter cartridge is properly installed. It will also be noted from the various figures that each projection 46, specifically the radial lip 46c, is recessed below the upper surface of exposed upper edge 38. The number of slots 42 and the complementing number of slots 43 can be varied from 6-0 to 0-6 and all combinations between these extremes. If added security is desired in terms of physically capturing one or more of the projections 46, then the side walls of the receiving slot can be shaped with detent ribs or bumps for a snap fit.

Figure 22:
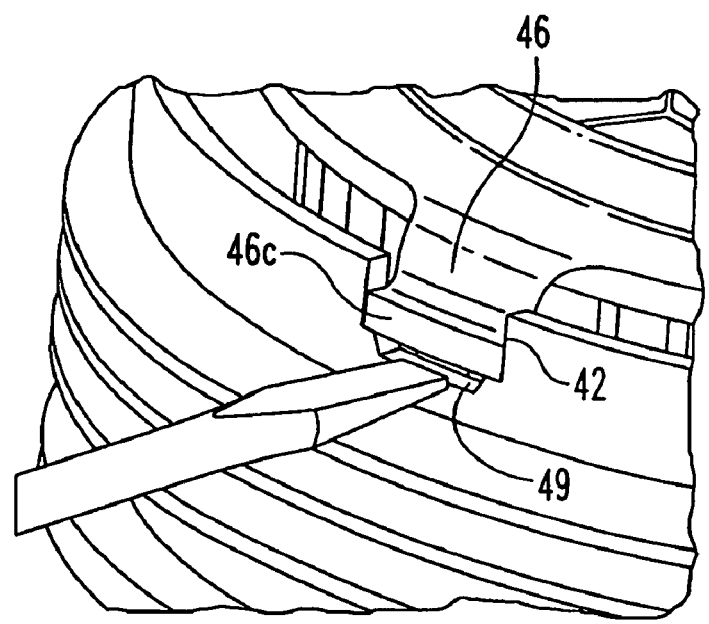
FIG. 22 is a perspective view of a removal procedure.

Slot 42 is illustrated in greater detail in FIG. 16A and slot 43 is illustrated in greater detail in FIG. 16B. The broken line outline in each of these two drawing figures represents the shape and proper positions of section 46c of the received projection 46. The construction and arrangement of each slot 42 creates a sufficiently tight interference fit with the received projection 46 to anchor and hold the fluid filter cartridge 22 into shell 21. As illustrated, a small clearance space 49 is defined beneath section 46c and is located between lower surface 50 of slot 42 and the flat lower surface 46f of the corresponding projection 46. The clearance space 49 is used to receive the flat tip of hand tool, such as a screwdriver, in order to be able to pry up on the corresponding projection 46 that is received within slot 42 in order to pop the projection free of its interference fit (see FIG. 22). As noted, it is not possible to install the fluid filter cartridge 22 unless the correct shell 21 has been selected.

Figure 23:
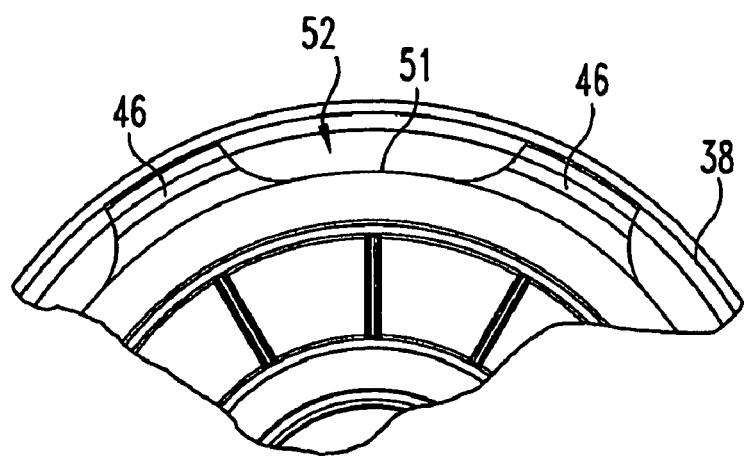
FIG. 23 is a partial perspective view of a filter assembly.

Due to the outwardly extending design of projections 46 in a radially outward direction from the outer circular edge 51 of endplate 24, flow clearance spaces 52 are defined between each pair of adjacent projections 46. See FIG. 23 for one example of a defined flow clearance space 52. These clearance spaces provide the necessary flow channels into shell 21 for the fluid to be filtered by the filtering media element. The outline of each clearance space 42 is defined by the inner surface of upper edge 38, the outer circular edge 51, and the adjacent pair of projections 46. These six clearance spaces 52 provide a flow path for the fluid to be filtered that arrives by way of the head and flows onto the endplate outside of the return flow sleeve 44. This allows faster and smoother routing of the fluid flow in view of the number and size of the flow openings (i.e., clearance spaces 52) and enables more efficient fluid filtration and processing. As the fluid to be filtered flows across the exposed surface of the endplate, it reaches the flow clearance spaces 52 and flows through these spaces to the annular clearance space defined by and between the inside surface 33 of the sidewall 28 and the outer cylindrical surface (pleated) of the filter media pack 23.

The cartridge endplate 24 and cooperating shell 21 preferably reduce or eliminate the possibility that an incorrect or improper fluid filter cartridge will be installed. Any cartridge without the proper number, style, and spacing of endplate projections 46 will not fit "properly" into the shell 21. The elimination of the rib ledge structures from the axially extending ribs 34 means that there is nothing to support the non-approved fluid filter cartridge when inserted into the shell and there is nothing to set or control the desired depth for the cartridge except for the upper edge 38 of sidewall 28 of shell 21. If the upper edge is attempted to be used in some manner to control the depth of the cartridge, it means that the edge cannot fit flush against or within the head. This also prevents proper compression of the gasket or seal and will result in leakage. The only option for a proper assembly and proper fit to the head is to utilize slots 42 and 43 with the designed number of cooperating projections as part of the endplate. However, that cooperating structure would mean an endplate conforming to the configuration of endplate 24 and thus the only fluid filter cartridge fully compatible with shell 21 is to use one that is designed to cooperate with slots 42 and 43. The retention capability afforded by the interference fit and insertion of projections 46 into slots 42 and 43 means that there will be an important retention feature during the assembly process.

The cartridge 22 and shell 21 combination also permits an increased media area. By using the endplate 24 and the upper edge 38 to set the axial depth of cartridge 22, the media portion of the cartridge can be longer. This embodiment raises the upper edge of the cartridge closer to edge 38 and the opposite end can be extended deeper into the shell.

While exemplary embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to to the contrary in the claim. When the language "at least a portion" and/or "a portion" is used the item can include a portion and/or the entire item unless specifically stated to the contrary.

What is claimed is:

1. A replaceable filter element comprising:
    an annular, pleated filter media having a first end, a second end, and defining an interior cavity;
    a first endplate coupled to the first end of the filter media, the first endplate including: an outer periphery; an opening leading to the interior cavity, the opening forming a fluid passage for filtered fluid; a sleeve adjacent the opening and extending away from the second end to an end; an annular sealing gasket disposed around the sleeve, the sealing gasket being rectangular in cross-section, and is disposed in a space between the sleeve and a first flange that surrounds the sleeve, the annular sealing gasket does not extend beyond the end of the sleeve; and a first plurality of legs extending from the outer periphery to leg extremities located outward from the outer periphery; each leg includes an upper, radially outward extending section connected to the outer periphery of the first endplate, and an axially depending section that overlaps the filter media and that extends toward the second end;
    the first flange projects from the first endplate in the same direction as the sleeve, and the first endplate further includes a second flange surrounding the first flange and projecting from the first endplate in the same direction as the first flange, and a plurality of circumferentially spaced ribs projecting from the first endplate and extending between the first flange and the second flange; and
    a second endplate coupled to the second end of the filter media.

2. The replaceable filter element of claim 1, wherein the sleeve extends away from the first endplate a greater distance than the first flange and the second flange; the first flange and the second flange project from the first endplate substantially the same distance; and the annular sealing gasket extends beyond ends of the first and second flanges.

3. The replaceable filter element of claim 1, wherein there are no flow openings in the first endplate between the first flange and the second flange.

4. A replaceable filter element comprising:
    an annular, pleated filter media having a first end, a second end, and defining an interior cavity;
    a first endplate coupled to the first end of the filter media, the first endplate including: an outer periphery; an opening leading to the interior cavity, the opening forming a fluid passage for filtered fluid; a sleeve adjacent the opening and extending away from the second end; an annular sealing gasket disposed around the sleeve, the sealing gasket being rectangular in cross-section, and is disposed in a space between the sleeve and a first flange that surrounds the sleeve; the first flange projects from the first endplate in the same direction as the sleeve; a second flange connected to the first endplate surrounding the first flange and projecting from the first endplate in the same direction as the first flange; a plurality of circumferentially spaced ribs projecting from the first endplate in the same direction as the first flange and the second flange and extending between the first flange and the second flange; and a first plurality of legs extending from the outer periphery to leg extremities located outward from the outer periphery; each leg includes an upper, radially outward extending section connected to the outer periphery of the first endplate, and an axially depending section that overlaps the filter media and that extends toward the second end; and
    a second endplate coupled to the second end of the filter media.

5. The replaceable filter element of claim 4, wherein the sleeve extends away from the first endplate a greater distance than the first flange and the second flange; the first flange and the second flange project from the first endplate substantially the same distance; the annular sealing gasket extends beyond ends of the first and second flanges, and the annular sealing gasket does not extend beyond an end of the sleeve.

6. The replaceable filter element of claim 4, wherein there are no flow openings in the first endplate between the first flange and the second flange.

7. The replaceable filter element of claim 4, further comprising a space between the annular sealing gasket and the first flange.

8. A replaceable filter element comprising:
    an annular, pleated filter media having a first end, a second end, and defining an interior cavity;
    a first endplate coupled to the first end of the filter media, the first endplate including: an outer periphery; an opening leading to the interior cavity, the opening forming a fluid passage for filtered fluid; a sleeve adjacent the opening and extending away from the second end; an annular sealing gasket disposed around the sleeve, the sealing gasket being rectangular in cross-section, and is disposed in a space between the sleeve and a first flange that surrounds the sleeve; a space between the annular sealing gasket and the first flange; and a first plurality of legs extending from the outer periphery to leg extremities located outward from the outer periphery; each leg includes an upper, radially outward extending section connected to the outer periphery of the first endplate, and an axially depending section that overlaps the filter media and that extends toward the second end;

the first flange projects from the first endplate in the same direction as the sleeve, and the first endplate further includes a second flange surrounding the first flange and projecting from the first endplate in the same direction as the first flange, and a plurality of circumferentially spaced ribs projecting from the first endplate and extending between the first flange and the second flange; and a second endplate coupled to the second end of the filter media.

9. The replaceable filter element of claim 8, wherein the sleeve extends away from the first endplate a greater distance than the first flange and the second flange; the first flange and the second flange project from the first endplate substantially the same distance; and the annular sealing gasket extends beyond ends of the first and second flanges.

10. The replaceable filter element of claim 8, wherein there are no flow openings in the first endplate between the first flange and the second flange.

11. A replaceable filter element comprising:

an annular, pleated filter media having a first end, a second end, and defining an interior cavity;

a first endplate coupled to the first end of the filter media, the first endplate including: an outer periphery; an opening leading to the interior cavity, the opening forming a fluid passage for filtered fluid; a sleeve adjacent the opening and extending away from the second end; an annular sealing gasket disposed around the sleeve, the sealing gasket being rectangular in cross-section, and is disposed in a space between the sleeve and a first flange that surrounds the sleeve; the first flange projects from the first endplate in the same direction as the sleeve; a second flange connected to the first endplate surrounding the first flange and projecting from the first endplate in the same direction as the first flange; there are no flow openings in the first endplate between the first flange and the second flange; and a first plurality of legs extending from the outer periphery to leg extremities located outward from the outer periphery; each leg includes an upper, radially outward extending section connected to the outer periphery of the first endplate, and an axially depending section that overlaps the filter media and that extends toward the second end; and a second endplate coupled to the second end of the filter media.

12. The replaceable filter element of claim 11, further comprising a plurality of circumferentially spaced ribs projecting from the first endplate and extending between the first flange and the second flange.

13. The replaceable filter element of claim 11, wherein the sleeve extends away from the first endplate a greater distance than the first flange and the second flange; the first flange and the second flange project from the first endplate substantially the same distance; and the annular sealing gasket extends beyond ends of the first and second flanges.

14. The replaceable filter element of claim 11, further comprising a space between the annular sealing gasket and the first flange.

* * * * *